(No Model.)

G. M. DOERSCH.
TIRE TIGHTENER.

No. 598,078. Patented Feb. 1, 1898.

Witnesses
Jas. H. Blackwood
H. P. Doolittle

Inventor
George M. Doersch
by W. H. Doolittle & Son
Attorneys

UNITED STATES PATENT OFFICE.

GEORGE M. DOERSCH, OF ANTIGO, WISCONSIN, ASSIGNOR OF ONE-HALF TO RICHARD KOEBKE, OF SAME PLACE.

TIRE-TIGHTENER.

SPECIFICATION forming part of Letters Patent No. 598,078, dated February 1, 1898.

Application filed April 26, 1897. Serial No. 633,912. (No model.)

*To all whom it may concern:*

Be it known that I, GEORGE M. DOERSCH, a citizen of the United States, residing at Antigo, in the county of Langlade and State of Wisconsin, have invented certain new and useful Improvements in Tire-Tighteners and Felly-Protectors; and I do hereby declare the following to be a full, clear, and exact description of the invention, such as will enable others skilled in the art to which it appertains to make and use the same.

My invention relates to tire-tighteners and felly-protectors; and it consists of a packing composed of two clasps adapted to be inserted between the shoulder of the spoke and the felly for the purpose of taking up space between the spoke and felly, tightening the tire, and protecting the felly, all as more fully hereinafter described and claimed.

My invention is illustrated in the accompanying drawings, in which—

Figure 1:
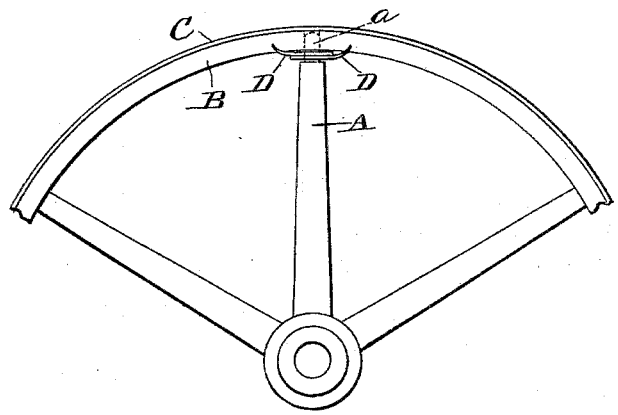
Figure 2:
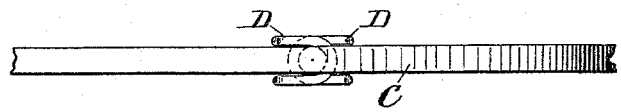
Figure 3:
Figure 4:
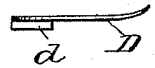
Figure 5:
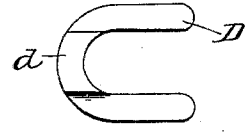

Figure 1 is a side view of packing as applied to spoke; Fig. 2, a plan view, and Figs. 3, 4, and 5 details.

Referring to the drawings, A is the spoke of a wheel; $a$, the tenon thereof; B, the felly, and C the tire.

The packing is preferably of steel and is made in two parts D D, each semi-elliptical or of horseshoe shape, constituting a clasp for the purpose hereinafter described. Each clasp has a lug $d$ at its inner end, and when the clasps are in place these lugs engage and lock the parts together.

After the felly and spoke have been sprung apart by any suitable device adapted for this purpose, such as the apparatus shown in my pending application, Serial No. 633,913, the packing is placed on the spoke-tenon between the shoulder of the spoke and the felly to take up space, and the tire and felly are then allowed to spring back in place. If necessary, more than one packing may be employed, and the shape of the wheel can always be kept perfect in dry or wet weather by putting on additional clasps or removing some, which can be done in a few minutes. After the packing has been put in place and the tire and felly sprung back the ends of the clasp which embrace the felly are driven in and clenched against the felly, thus preventing the same from splitting.

Having thus described my invention, what I claim is—

A packing for tightening tires, consisting of two removable clasps placed on the tenon of a spoke, and having engaging projections to lock them in place thereon, said clasps embracing the felly of the wheel and clenched against the same, substantially as described.

In testimony whereof I affix my signature in presence of two witnesses.

GEORGE M. DOERSCH.

Witnesses:
 JOHN A. OGDEN,
 MILLIE E. CURTIS.